July 15, 1969     I. W. TITTERTON     3,455,812
ELECTRODE FOR USE IN ELECTROCHEMICAL MACHINING
Filed Aug. 16, 1966

Inventor
Ivan William Titterton

By Cushman, Darby & Cushman
Attorneys

United States Patent Office 3,455,812
Patented July 15, 1969

3,455,812
ELECTRODE FOR USE IN ELECTROCHEMICAL MACHINING
Ivan William Titterton, Willington, Derby, England, assignor to Rolls-Royce Limited, Derby, England, a British company
Filed Aug. 16, 1966, Ser. No. 572,748
Claims priority, application Great Britain, Sept. 15, 1965, 39,323/65
Int. Cl. B23p 1/16, 1/02; B01k 3/04
U.S. Cl. 204—284      3 Claims

ABSTRACT OF THE DISCLOSURE

An electrochemical machining electrode having a primary orifice which communicates with primary electrolyte supply means. A secondary electrode having an orifice is located within the primary orifice and communicates with secondary electrolyte supply means. Cusps formed in the vicinity of the primary orifice are reduced by the secondary electrode.

---

This invention relates to an electrode for use in electrochemical machining.

According to the present invention an electrode for use in electrochemical machining comprises a conductive part having a shaped working surface and an orifice in the working surface adapted to permit electrolyte to flow to said surface, and supply means adapted to supply electrolyte to said orifice, a secondary electrode structure in said orifice and secondary supply means adapted to supply electrolyte to said secondary electrode, said secondary electrode being adapted to reduce the formation of cusps in a workpiece due to said orifice.

Said secondary electrode may comprise a plurality of tubes, said secondary supply means being adapted to supply the electrolyte through said tubes.

Said orifice may comprise a linear slot, and said tubes may form a linearly extending rank centrally positioned in said orifice.

The invention will now be particularly described merely by way of example with reference to the accompanying drawings in which.

Figure 1:
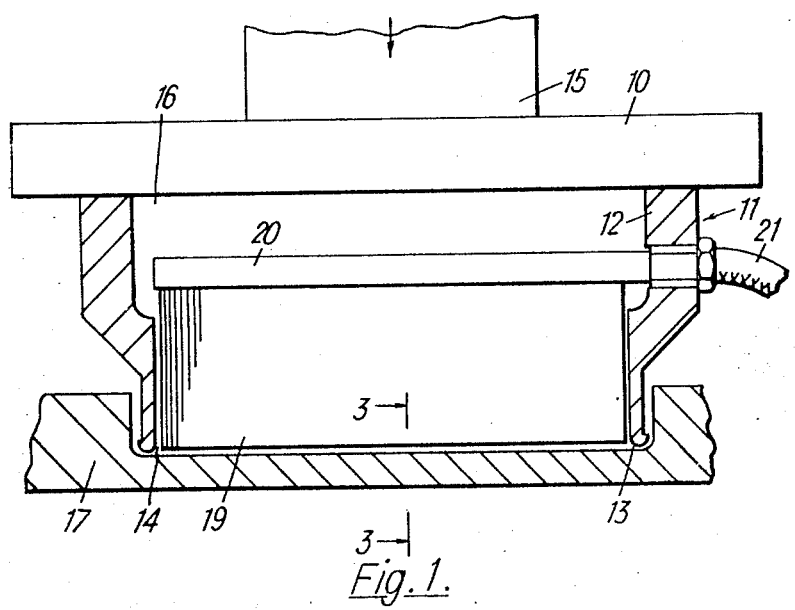
FIGURE 1 is a partly broken away elevation of an electrode according to the present invention together with its workpiece.

In FIGURE 1 there is shown a backing member 10 on which there is mounted a conducting electrode 11. The electrode 11 comprises a hollow body portion 12 which reduces to a shaped working portion 13 having a slot 14 therein. Electrolyte is supplied as shown by the arrows through the backing member 10 by way of an inlet pipe 15 and passes through the hollow interior 16 of the electrode 11 and passes through a slot 14 to flow between the working surface 13 and the workpiece 17.

In operation the electrode 11 is maintained at a negative potential while the workpiece 17 is maintained at a positive potential. Electrolyte is passed through the inlet pipe 15 and current flows between the electrode 11 and the workpiece 17 causing erosion of the workpiece.

Figure 2:
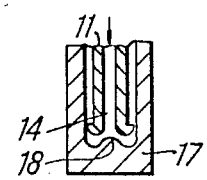
FIGURE 2 is a section through an electrode and the workpiece which do not incorporate the present invention.

FIGURE 2 shows the shape of the hole eroded in the workpiece 17 by the electrode 11 with the device so far described. It will be seen that where the slot 14 opens on to the working surface 13 erosion takes place at a slower speed than over the remainder of the workpiece. Therefore a cusp 18 is left in the workpiece.

It is in order to prevent the formation of cusp 18 that the present invention is directed.

Returning to FIGURE 1 it will be seen that there is additional feature in the form of a linear rank of contingent capillary tubes 19 which are centrally mounted in the slot 14 with their extremities lying a small distance behind the working surface 13.

Figure 3:
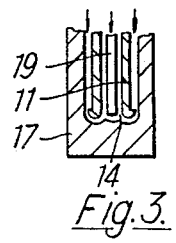
FIGURE 3 is a view similar to that of FIGURE 2 but showing the effect of an electrode according to the present invention.

The tubes 19 are connected to a single tube 20 which forms an electrolyte manifold. Electrolyte can be fed by supply means (not shown) by way of an inlet tube 21 to the manifold 20 and hence through the tubes 19. The manifold 20 and tubes 19 are formed of an electrically conducting material and are in electrical contact with the electrode 11. It will therefore be seen that when the electrode is in use the tubes 19 form in effect a secondary electrode having its own electrolyte supply, and this secondary electrode being centrally positioned in the slot 14 erodes away the cusp 18 to form a surface on the workpiece which is substantially without cusps as shown in FIGURE 3.

It will be noted that although the invention is described above as it relates to an electrode for machining holes in a workpiece, the invention can equally well be used in an electrode adapted to contour the outer surfaces of workpieces. Again although the secondary electrode has been described as a rank of tubes, it is not essential that the electrode should be so formed and it could for instance take the form of a hollow electrode similar to the electrode 14 but of considerably reduced dimensions.

I claim:
1. An electrode for electrochemically machining a workpiece, said electrode comprising an electrically conductive member, a shaped working surface on said member, a primary electrolyte supply means, a primary orifice in said working surface adapted to receive electrolyte from said primary supply means for issuing electrolyte therefrom allowing it to flow between said working surface and said workpiece, a secondary electrode structure positioned within said orifice, a secondary electrolyte supply means, and a secondary orifice within said secondary electrode for receiving electrolyte from said secondary supply means and for issuing electrolyte therefrom reducing the formation of cusps on said workpiece in the vicinity of said primary orifice.

2. An electrode as claimed in claim 1 and in which said secondary electrode structure comprises a plurality of tubes having open ends which together form a working surface, said secondary supply means supplying the electrolyte through said tubes.

3. An electrode as claimed in claim 2 and in which said primary orifice comprises a linear slot, and said tubes form a linearly extending rank centrally positioned in said primary orifice.

References Cited

UNITED STATES PATENTS

| | | | |
|---|---|---|---|
| 3,019,178 | 1/1962 | Williams | 204—284 |
| 3,123,545 | 3/1964 | Williams | 204—224 |
| 3,288,698 | 11/1966 | Bruns | 204—224 |
| 3,383,302 | 5/1968 | Johnson | 204—224 |

JOHN H. MACK, Primary Examiner
D. R. JORDAN, Assistant Examiner

U.S. Cl. X.R.
204—224